(12) United States Patent
Kaiserswerth et al.

(10) Patent No.: US 6,195,701 B1
(45) Date of Patent: Feb. 27, 2001

(54) METHOD AND APPARATUS FOR SYNCHRONIZATION AND SCHEDULING OF MULTIPLE DATA STREAMS AND REAL TIME TASKS

(75) Inventors: Matthias Kaiserswerth, Richterswil; Erich Ruetsche, Pfaeffikon, both of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/682,523

(22) PCT Filed: Mar. 16, 1994

(86) PCT No.: PCT/EP94/00833

§ 371 Date: Jul. 25, 1996

§ 102(e) Date: Jul. 25, 1996

(87) PCT Pub. No.: WO95/25313

PCT Pub. Date: Sep. 21, 1995

(51) Int. Cl.$^7$ ........................................... G06F 15/16
(52) U.S. Cl. .................... 709/231; 709/205; 709/207; 709/236; 709/248; 370/345; 370/350
(58) Field of Search ................... 709/204–207, 709/231, 236–237, 245, 100, 102–103, 107; 370/345, 349–350, 509

(56) References Cited

U.S. PATENT DOCUMENTS

| | | | | |
|---|---|---|---|---|
| 5,737,531 | * | 4/1998 | Ehley | 709/231 |
| 5,903,617 | * | 5/1999 | Kamalski | 375/354 |
| 6,061,784 | * | 5/2000 | Tarsky et al. | 709/231 |

* cited by examiner

*Primary Examiner*—Zarni Maung
*Assistant Examiner*—Bharat Barot
(74) *Attorney, Agent, or Firm*—John D. Flynn

(57) ABSTRACT

The present invention concerns a method and an apparatus for the synchronization and the scheduling of multiple data streams and real time tasks. In accordance with the present invention, pointers pointing to the information streams to be synchronized and processed are kept in the table (51) of a selector (11). The time marks (S1Start etc.) of said information streams are stored in a table (61) of a timer. The system time is checked against said time marks and if a time mark has been reached, the table (51) of said selector (11) is updated. If the status of an information stream is such that its trigger condition is fulfilled, the pointer to said information stream is made available at the output of the selector (11). This pointer is then used to retrieve the respective information stream and to forward it to a playout device.

14 Claims, 4 Drawing Sheets

METHOD AND APPARATUS FOR SYNCHRONIZATION AND SCHEDULING OF MULTIPLE DATA STREAMS AND REAL TIME TASKS

TECHNICAL FIELD

The present invention concerns a method and apparatus for the synchronization and the scheduling of multiple data streams as well as for the scheduling of tasks in operating systems with hard real-time requirements.

BACKGROUND OF THE INVENTION

Multimedia information is composed of several objects that constitute a document. These objects could be of different data types, such as text, still images, video, and sound. In order for these objects to be meaningful to a user, there must be a logical and temporal structure of the objects constituting the documents' contents. To ensure this logical and temporal structure, e.g. when displaying a video sequence on a display device and providing a soundtrack for this video sequence via an adapter card to a speaker, the respective data streams have to be synchronized and scheduled before being sent to the output devices. The same principle applies to other related multimedia information which has to be synchronized in communicating with other devices or users (e.g. teleconferencing), before processing and presentation.

Synchronization and scheduling is a critical task for a wide spectrum of applications ranging from computer-integrated telephony, text with voice annotations, any kind of multi media systems, and interactive services (e.g. interactive television) to cooperative teleworking on documents including foils and video, and distributed games. A further application, where information streams have to be synchronized, is known as medical imaging, for which high-resolution images must be distributed reliably and fast throughout a hospital.

To date, the synchronization is typically performed in software. However, if the scheduling intervals are too short, or if too many information streams must be synchronized, a software solution, which is very CPU intensive, is often the limiting factor as far as processing speed is concerned.

In real-time systems time-critical tasks have to be scheduled reliably and fast. In the present context, any system in which the time at which an output is produced is significant, is referred to as real-time system. The lag from the input time of a real-time system to its output time, i.e. the delay, must be sufficiently small for acceptable timeliness. In other words, a real-time system has to respond to an externally-generated input stimuli within a finite and specified period. In hard real-time systems, i.e. in those systems where it is absolutely imperative that responses occur within a specified deadline, scheduling of time-critical tasks is of particular interest. However, the present invention is not limited to hard real-time systems. It might be used in soft real-time systems, too. Such a soft real-time system would still function correctly if deadlines are occasionally missed, and a hardware solution in accordance with the present invention might be to costly under certain circumstances.

SUMMARY OF THE INVENTION

It is an object of the present invention to provide a method and apparatus for off-loading the synchronization of multiple information streams from the processor of the system handling these information streams.

It is an object of the present invention to provide a method and apparatus for fast and reliable synchronization and scheduling of multiple information streams.

It is another object of the present invention to provide a method and apparatus for scheduling tasks or processes in real-time systems.

The above objects have been accomplished by handling pointers pointing to the information streams to be synchronized and by maintaining a table with status information of each information stream. The time marks of said information streams are stored in a table and the system time is checked against said time marks. If a time mark has been reached the status information of the respective information stream is updated. If the status of an information stream is such that its trigger condition is fulfilled, the pointer to said information stream is made available for playout of this information stream.

BRIEF DESCRIPTION OF THE DRAWINGS

The invention is described in detail below with reference to the following drawings.

DETAILED DESCRIPTION OF THE INVENTION

Figure 1:
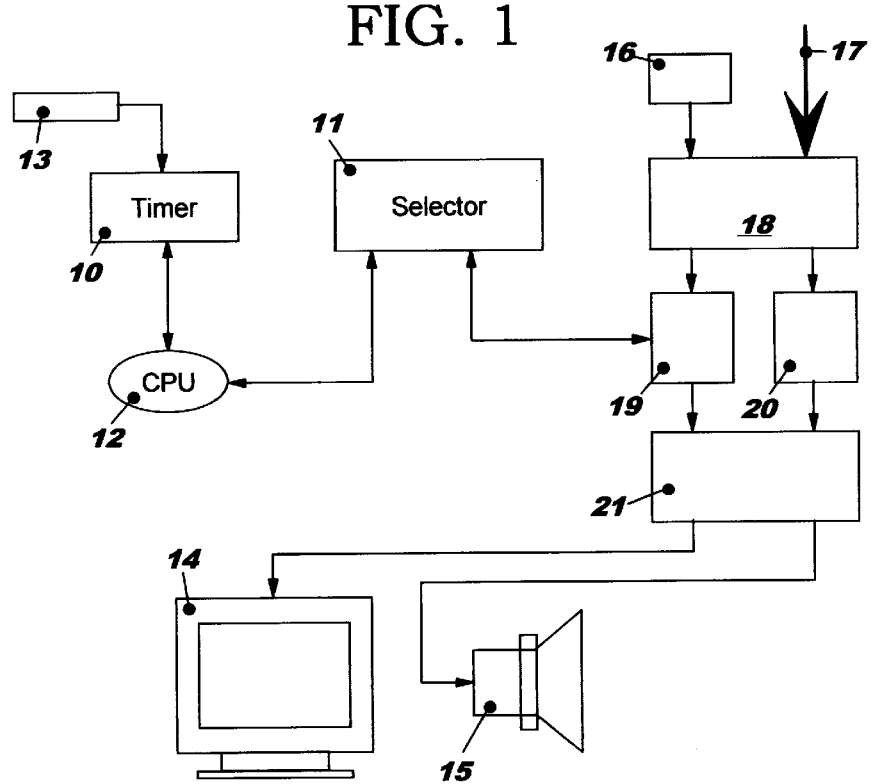
FIG. 1 shows a system, in accordance with the present invention, for playout of two information streams.
Figure 2:
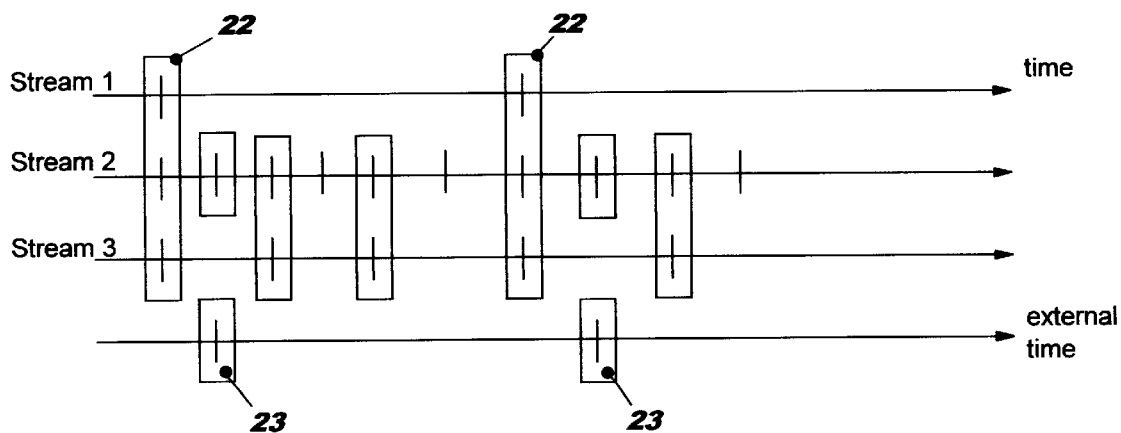
FIG. 2 illustrates the synchronization of multiple data streams.

In multimedia systems multiple data streams must be synchronized and scheduled for playout to, for example, a speaker 15 and a video display 14, as illustrated in FIG. 1. The synchronization of multiple data streams is illustrated in FIG. 2. The three streams are synchronized at so-called synchronization points (SyncPoint) 22. A stream may be synchronized to one or multiple other streams or to time stamps 23 defined by an external clock. This synchronization is typically performed in software, as discussed previously. In the following, a mechanism is presented which performs synchronization and output scheduling of multiple data streams in hardware without central processing unit (CPU) interaction. The same mechanism can also be used for scheduling tasks in real-time systems.

Figure 3:
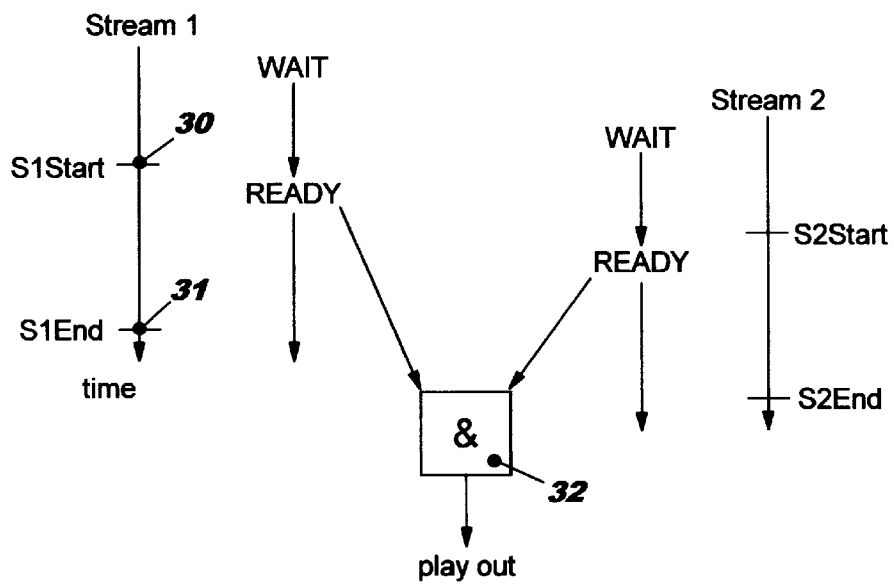
FIG. 3 illustrates the synchronization and play out of two data streams when the respective trigger condition is fulfilled.

A data stream is a sequence of data units. In FIG. 3, the synchronization of two data units is illustrated. The SyncPoints are translated to time marks relative to the system which processes the received data streams. The SyncPoints might be translated to time marks by means of a clock or counter of said system. In the example given in FIG. 3, a data unit from stream 1 cannot be played out before a time mark 30 (S1Start) and it must be played out before a time mark 31 (S1End). The same applies to the second data stream (stream 2). As illustrated in FIG. 3, at least two different states (WAIT, READY) can be associated with a data stream. Before SxStart of a data stream x has been reached, the respective data unit is in the WAIT state. After SxStart and before SxEnd it is in the READY state. It is conceivable to assign further states, such as a DELAYED state, to these data streams. The DELAYED state might be associated to a data unit after SxEnd.

In order to be able to synchronize two data units for playout, trigger conditions are defined in accordance with the present invention. A typical rigger condition might be:

IF both data units are in the READY state
THEN they can be played out.

The trigger conditions are checked and as soon as the condition is fulfilled, the data units are played out. This concept is schematically illustrated in FIG. 3, where means for checking the trigger condition 32 are shown.

In general, two or more date units can be related in time by trigger conditions, which can be an arbitrary logical combination of the different states of the respective data units. Fulfilling a given trigger condition then initiates the appropriate operation on the units.

Figure 4:
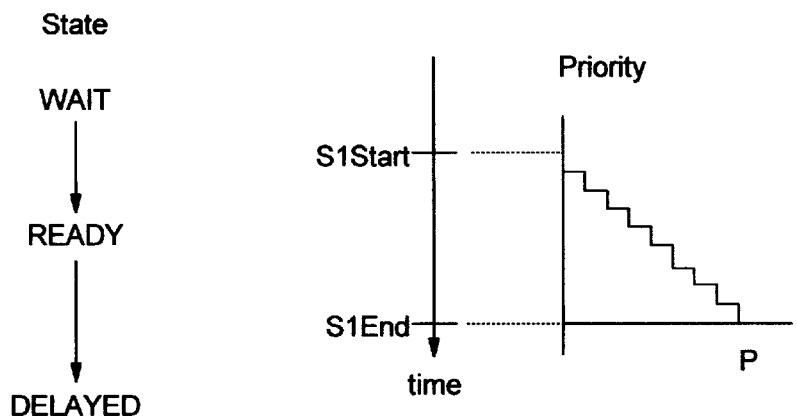
FIG. 4 illustrates how a priority value might be increased with advancing time.

The synchronization can be further enhanced with a priority value P to distinguish between data units (or tasks) which fulfill a trigger condition to select an older or more important stream (or task). This, for example, prioritization of streams that should not be delayed, whereas other data streams might be delayed. In FIG. 4 an example is shown where the priority value P of a data unit (or task) can be increased in time. In this example, three different states (WAIT, READY, DELAYED) are associated with the data stream. The priority value P might also be increased or decreased by interaction of a processor or upon receipt of a feedback signal of a playout device.

A first embodiment of the present invention is schematically illustrated in FIG. 1. According to this example, two data streams are received by means 18 for extraction of time marks. The first data stream originates from a storage disk 16, whereas the second data stream is sent via a network 17 to said means 18 for extraction of time marks. After extraction of the time marks, the data units of the two data streams are stored in buffers 19 and 20, and the respective time marks are provided to a timer 10. The buffer addresses are forwarded to a selector 11. In addition, a system clock or counter 13 is connected to said timer 10, and a processor, e.g. a CPU, might be linked to the timer 10 and selector 11. Two playout devices, a display unit 14 and a loudspeaker 15, are connected via an interface playout device to the buffers 19 and 20.

Figure 5:
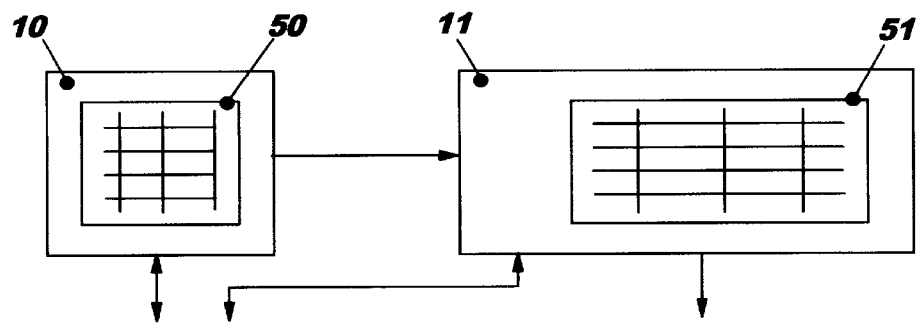
FIG. 5 shows the two core components of an apparatus for synchronization and scheduling of data streams and real time tasks, in accordance with the present invention.

The two core components of the present invention are the timer 10 and the selector 11. Their operation is described in connection with FIG. 5.

The timer 10 holds a table 50 with entries concerning the time marks of each data unit received and stored in a buffer. These time marks are relative to a time signal either being generated by a system clock 13 or a counter. Each time mark reached is then output to the selector 11. The table 50 is written by an external processor. The selector comprises a table 51 where for each data unit in a buffer a pointer to said data unit, i.e. the respective buffer address, the state of said data unit, and the trigger condition are held. Data units to be synchronized are linked into a circular list via their table entries. For each time mark received from the timer 10, the sector 11 updates the status field of the concerned data unit and then checks the trigger condition of all data units to be synchronized with said data unit. Once the trigger condition is fulfilled, the pointer to the data unit (or units) is made available at the output of selector 11. The output of the pointer then triggers retrieval and playout of the data unit by means of the playout device 21. Table 51 of the selector 11 might be maintained and updated by an external processor, e.g. CPU 12.

The timer 10 reads the current system time and returns the address of a unit pointer in the selector 11. This function can be provided in several ways. First, a solution based on a content addressable memory (CAM) is presented which is suitable for a high resolution timer but relatively expensive. The second solution is less expensive and is suitable for lower resolution timers and for implementing timer priority as described below. The two solutions are shown in FIGS. 6A and 6B, respectively.

Figure 6A:
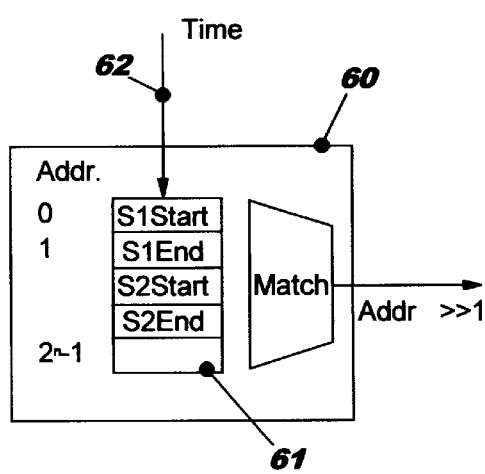
FIG. 6A shows a first exemplary embodiment of the timer.

The CAM timer 60 is illustrated in FIG. 6A. It comprises a CAM 61. The start and end time mark for each data unit to be scheduled are written into consecutive addresses of the CAM 61. The addresses then differ only in the least significant bit. Thus, for a CAM of $2^n$ addresses, n–1 bits determine the address of the scheduling unit pointer in the selector table 51. The width of a CAM entry is determined by the resolution of the time signal received at input 62. For a 32-bit time signal also a 32-bit wide CAM 61 is required.

Figure 6B:
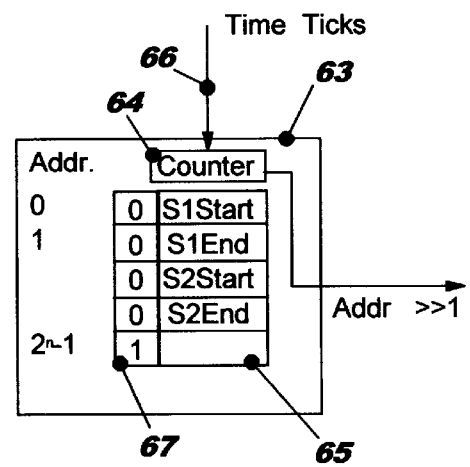
FIG. 6B shows a second exemplary embodiment of the timer.

For lower time resolution a timer 63 with counter 64, as shown in FIG. 6B, might be employed. In this case the difference between the current time and the time mark is calculated and its two's complement is written to the timer table 65. The counter 64 increments each entry for each time tick at input 66. If the carry bit of an entry becomes set, its address is shifted right by one bit and output to the selector 11. As the counter 64 continues to increment the entries, the content of the entry (with its carry bit=1) can then be used to reflect the time passed since reaching the start and/or end time. The counter value thus describes a time based priority. With this counter value a priority value P might be generated. The width of a timer entry can range from 8 to 32 bits depending on the timer resolution and the required timer differences. A free flag 67 might be provided in order to mark free table entries in table 65. This flag 67 is used by the counter to determine which entries it must increment.

For both schemes, a FIFO can hold free timer table entries to reduce the management load of the external processor. The processor gets a free entry from the FIFO and writes delayed entries, or entries which are freed, to the FIFO. The selector might directly write delayed entries to this FIFO.

The present invention is not limited to the above two implementations of timers since other timers are conceivable which are well suited for use with the invention.

Figure 7:
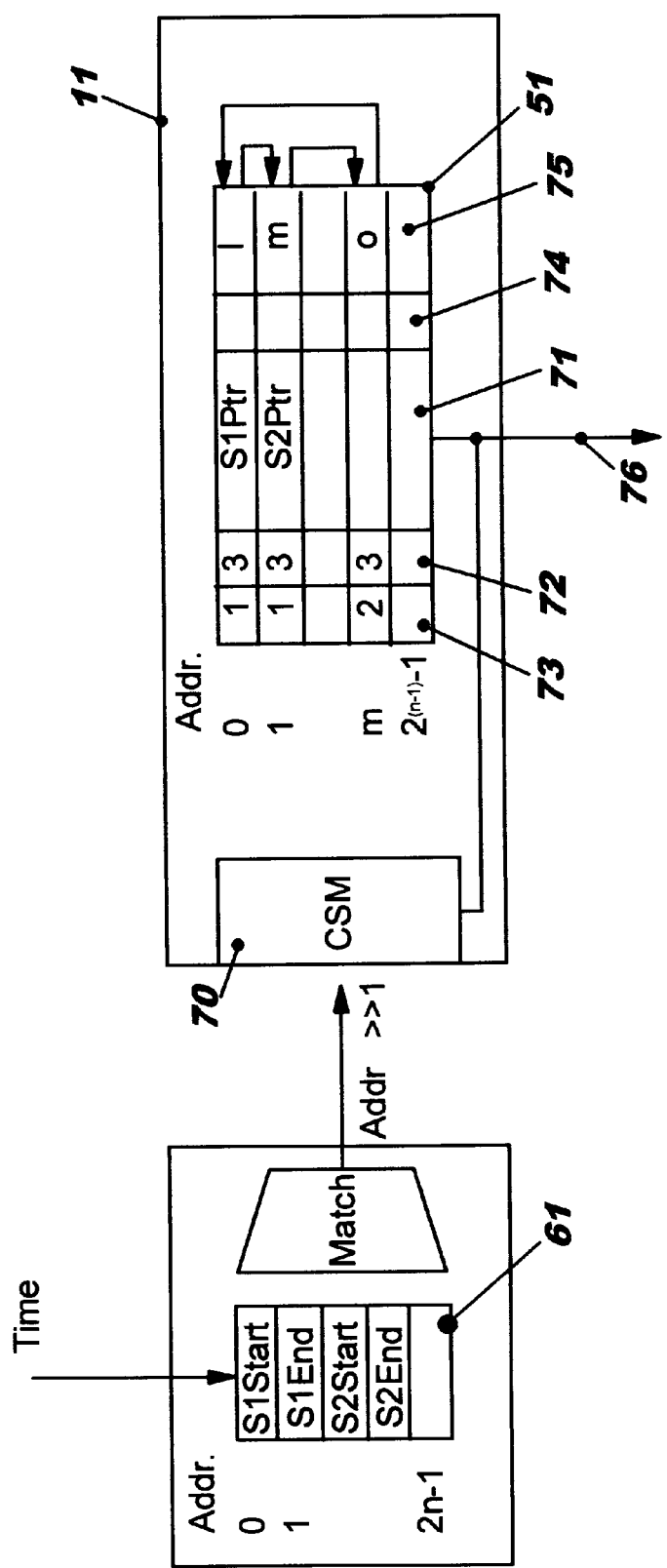
FIG. 7 shows an embodiment of the timer and selector, in accordance with the present invention.

The selector 11 comprises a table 51 and a comparator state machine (CSM) 70. The table 51 has $2^{(n-1)}$ entries (rows or columns). The exemplary implementation of the selector 11, given in FIG. 7, shows a table 51 with $2^{(n-1)}$ rows. Each row has a pointer field 71 holding the pointer, i.e. the buffer address S1Ptr, to the data unit to be scheduled, a p-bit wide priority field 72, a k-bit wide status field 73, a 2-bit wide trigger field 74, and an (n–1)-bit wide synchronization field 75. The width of said status field 73 depends on the number of different states. In case of three different state (WAIT, READY, DELAYED) the status field 73 is 2-bits wide. The synchronization field 75 holds a pointer linking all those entries with which a data unit must be synchronized into a circular list. This circular list is schematically illustrated by means of arrows on the right hand side of table 51. The CSM 70 receives the address of a unit pointer from the timer 10 and updates the state of the status field 73 in this row. The CSM 70 then follows the linked list of synchronizations entries and computes whether the trigger condition is fulfilled by comparing the status fields 73 with the trigger fields 74. The trigger condition might also be checked by means of simple logical elements such as AND-gates, OR-gates etc.

In the following, it is assumed, without loss of generality, that the trigger condition is fulfilled when all entries in the respective trigger fields 74 are in the READY state. In this case, the trigger state fields are redundant and might be omitted.

Once all the entries linked by the synchronization field 75 are READY, the CSM 70 outputs the entries according to their priorities, if any. With p=4, 16 priority classes can be distinguished. The width w of the scheduling unit pointer is determined by the memory (buffer) architecture of the system. The width s of the synchronization field 75 is determined by the size of the selector table 51, with s=n−1.

FIG. 7 illustrates the problem shown in FIG. 3. The time marks 30 (S1Start) and 31 (S1End) of data unit S1 are written to the addresses 0 and 1 of the CAM 61. The address of the pointer to the data unit S1 is the CAM address shifted right by one bit. An external processor 12 writes the time marks to the timer table, i.e. the CAM 61 and the entries to the selector table 51. For a data unit to be scheduled which requires priority, the priority field 72 is set. In this example a 4-bit wide priority field 72 is used. For each time mark reached, the state, reflected by the status field 73, is updated. If the state is READY, the CSM 70 reads the synchronization field 75 and follows the linked list to determine whether the state of all other entries fulfills the trigger condition. If the trigger condition is reached, the unit pointer with the highest priority is made available at output 76 first. If multiple units have the same priority, or in case that no priority fields are provided, the unit pointers might either be output in parallel or in a consecutive manner, e.g. by order of their position in the selector table 51. It is obvious that the priority fields 72 can be omitted, too.

Figure 8:
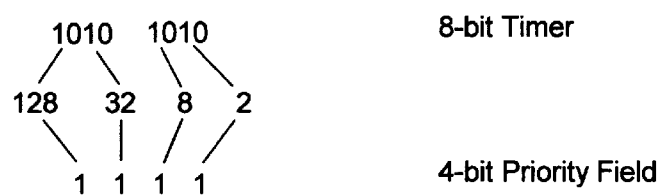
FIG. 8 shows an example of an 8-bit timer where every second bit is used.

In many systems, multimedia as well as real-time, the scheduling of actions, data streams, tasks, processes, or the playout of data units is determined by a priority which increases with time. If a counter timer, as illustrated in FIG. 6B, is used as the timer component 10, the entry in the timer table 65 also describes its priority. This priority can be used in the priority field 72 of the selector 11 to achieve time dependent scheduling. The four most significant bits of the timer entry are used to distinguish again 16 priorities. A different set of bits might be used if the priority must increase non-linearly. FIG. 8 shows an example of an 8-bit timer where every second bit is used to get a priority mechanism that maps the 256 timer values to 16 non-linear priority values P.

According to the present invention, a synchronization point (SyncPoint) is set up by writing the time marks to the free entries in the timer table and setting up the associated entries in the selector table. For each stream this takes one write operation to the timer and to the selector table, plus the operations to set up the selector table entry. The actual scheduling takes place in hardware without any further intervention of an external processor. For a solution in software a similar number of setup operations would be necessary but the search in a list of timers would take much longer. Typically timers involve interrupt processing which is very time consuming in particular in modern RISC processors with a large register file and instruction pipeline. In the present invention these operations are avoided and implemented in hardware. Additionally, the present invention can handle timers with much finer granularity than any software solution.

The present invention, which has been described by means of a multimedia related example, can be used in various multimedia communication subsystems, e.g. for multimedia multiparty teleconferencing, or multimedia protocol adapters. In ST-II and RTP protocol systems, for example, a playout time stamp can be extracted from the protocol header and used in the present scheduler (ST-II is the second version of an experimental Internet stream protocol, and RTP is a transport protocol for real-time applications). The present invention might also be used in multimedia bus systems which provide a time signal. Data units to be triggered at a specified time are written to the scheduler and the multimedia bus provides the timer input to the timer unit. The invention can also be used in a multimedia adapter such as the IBM ActionMedia II adapter (see IBM ActionMedia II Technical Reference, IBM 04G5144, 2nd Edition, June 1992, Mechanicsburg), or the MWave System (see "MWave Multimedia System", Technical Brief, Texas Instruments, 1992) to synchronize multiple data streams. The term ActionMedia is a trademark of the Intel Corporation and MWave is a trademark of the IBM Corporation.

As already mentioned in the introduction, the present invention might also be used in real-time systems for the scheduling of time-critical tasks or processes. For these kind of application there is no synchronization field in the table of the selector required. The CSM selects from the selector table the entry with the highest priority. The scheduling unit pointer, i.e. a pointer pointing to a task control block or to executable code, is then output. The timer priority mechanism described above can be used to implement scheduling policies with an explicit deadline, e.g. the earliest-deadline-first or least-slack time scheduling algorithm as disclosed in the book "Real-Time Systems and their Programming Languages", by A. Burns and A. Wellings, Addison-Wesley Publishing Company, International Computer Science Series, 1990. An external processor calculates the difference to the time marks and writes it to the timer table. The entries are then used to derive the priority of a job.

We claim:

1. An apparatus for synchronization of at least two information streams which comprises:
    a timer for holding a first table with time marks for each one of said information streams, and for making each time mark reached available at the timer output,
    a selector for holding a second table with
        pointer fields carrying pointers to each of said information streams,
        status fields carrying information concerning the status of each of said information streams, the status field of an information stream being updated each time a time mark of said information stream is reached and made available at said timer output,
    means for checking whether a trigger condition of an information stream is fulfilled by checking the corresponding status field, and
    means for making the pointer to an information stream whose trigger condition is fulfilled available for playout of said information stream.

2. The apparatus of claim 1, wherein said second table further comprises:
    trigger fields carrying information concerning the trigger conditions of each of said information streams.

3. The apparatus of claim 2, wherein said second table further comprises:

synchronization fields carrying, by means of a linked list, entries concerning information streams to be played out in a certain relationship to each other.

4. The apparatus of claim 3, wherein said second table further comprises:

priority fields carrying priority values (P) such that the information stream with highest priority is played out first if the respective trigger condition has been fulfilled.

5. The apparatus of claim 4, further comprising means for increasing said priority values (P) with advancing time.

6. The apparatus of claims 1, 2, 3, or 4, further comprising:

means for extracting said time marks from incoming information streams, buffer means for storing said information streams, playout means for retrieval of said information streams stored in said buffer means and for playout to the respective playout devices.

7. An apparatus for scheduling at least two real time tasks or two processes which comprises:

a timer for holding a first table with time marks for each one of said tasks or processes, and for making each time mark reached available at the timer output, a selector for holding a second table with pointer fields carrying pointers to task control blocks or executable code, means for making a pointer to a task control block or an executable code available at an output of said selector each time a time mark of said task or process is reached in said timer.

8. The apparatus of claim 7, wherein the pointer with highest priority is made available first.

9. A method for synchronization of at least two information streams, comprising the following steps:

a) checking whether a time mark of one of said information streams has been reached, b) updating the status information of said information stream whose time mark has been reached, c) determining whether the trigger condition of said information stream is fulfilled by checking said status information, and d) providing a pointer to said information stream for playout of the information stream if the trigger condition of said information stream is fulfilled.

10. The method of claim 9, wherein the playout of information streams, which have to be played out in a predefined relationship to each other, is scheduled by means of a linked list being organized such that each time when a status information of one of said information streams is updated, the status information of the other information streams are checked, and said information streams played out when all trigger conditions are fulfilled.

11. The method of claim 9, wherein a priority value (P) is assigned to each of said information streams, the information streams with highest priority being played out first.

12. The method of claim 11, wherein the priority value (P) of an information stream is increased with advancing time.

13. The method of claim 9, further comprising the following steps:

extracting and/or synchronizing the time marks of said information streams, storing said information streams in buffers, making the addresses of said buffers available as pointers for later retrieval of said information streams.

14. The method of claim 13, wherein said information stream is retrieved from said buffer by means of said pointer, prior to being sent to a playout device.

* * * * *

UNITED STATES PATENT AND TRADEMARK OFFICE
CERTIFICATE OF CORRECTION

PATENT NO. : 6,195,701 B1
DATED : February 27, 2001
INVENTOR(S) : Steven M. Blumenau and Yoav Raz It is certified that error appears in the above-identified patent and that said Letters Patent is hereby corrected as shown below:

Claim 11, column 18,
Line 38, delete [thorough] and insert -- through --

Claim 24, column 19,
Line 66, delete [thorough] and insert -- through --

Claim 38, column 21,
Line 38, delete [an] after the word "at"

Claim 50, column 22,
Line 67, delete [thorough] and insert -- through --

Claim 65, column 24,
Line 55, delete [thorough] and insert -- through --

Signed and Sealed this

Thirtieth Day of October, 2001

*Attest:*

*Attesting Officer*

NICHOLAS P. GODICI
*Acting Director of the United States Patent and Trademark Office*